Patented June 5, 1928.

1,672,377

UNITED STATES PATENT OFFICE.

CHARLES NORMAN EXLEY, OF GLASGOW, SCOTLAND, ASSIGNOR OF TWO-THIRDS TO DOUGALD McTAGGART AND WILLIAM NEILSON, BOTH OF GLASGOW, SCOTLAND.

WATERPROOF PAINT.

No Drawing. Application filed May 27, 1926. Serial No. 112,176.

This invention relates to waterproof paints, and its object is to provide a paint of this kind having improved waterproof and preservative properties and more lasting uniformity of composition.

According to the present invention, a waterproof paint comprises, in combination, sodium resinate solution, a pigment or pigments of which the properties are such as not to precipitate the sodium resinate, raw rosin or a solution thereof in turpentine or other solvent, and a quantity of water, all mixed with one another in such proportion as to form an emulsion, into which, if necessary, a colloidal substance may be introduced and thoroughly mixed to assist and maintain emulsification.

It has been found in practice, for example, that, for white clay pigments, a colloid is not required, the pigment mixing readily into the emulsion without auxiliary means. For ochre and sienna pigments, however, and for pigments comprising kieselguhr or lithopone, a colloidal substance has to be employed, to keep the constituents of the emulsion from separating out on standing. A colloid suitable for the aforesaid purpose is casein, which is also obtainable conveniently.

The following proportions are given by way of example of what I have found suitable in practice for a white (lithopone) paint:

By weight:

| | Per cent. |
|---|---|
| Pigment (lithopone) | 60 |
| Sodium resinate solution | 6 |
| Raw rosin | 9 |
| Turpentine | 7 |
| Water | 18 |
| | 100 | and to 100 parts of this composition we add from about 1 part to 5 parts of a colloid such as casein.

It is to be understood that I do not confine myself to these proportions as they may be varied more or less to suit requirements.

The waterproof paint made as hereinbefore described retains its initial uniformity of composition although stored away for considerable periods, and, at the same time, is such that it can be applied in accordance with any of the commonly accepted processes, as, for example, by means of brushes or by spray devices.

Having now fully described my invention what I claim and desire to secure by Letters Patent is:—

A waterproof paint comprising, by weight, 6 parts of sodium resinate soap, 60 parts of lithopone, 9 parts of raw rosin, 7 parts turpentine and 18 parts water, all mixed with one another in such proportion as to form an emulsion.

In testimony whereof I affix my signature.

CHARLES NORMAN EXLEY.